United States Patent [19]

Arnold et al.

[11] Patent Number: 4,663,371
[45] Date of Patent: May 5, 1987

[54] ADHESIVE COMPOSITION

[75] Inventors: Heinz B. Arnold; Clayton E. Workman, both of Golden Valley, Minn.

[73] Assignee: Henkel Corporation, Minneapolis, Minn.

[21] Appl. No.: 763,842

[22] Filed: Aug. 8, 1985

[51] Int. Cl.$^4$ .......................... C08K 5/13; C08L 77/00
[52] U.S. Cl. .................................. 524/343; 156/330.9; 428/475.2; 524/602
[58] Field of Search .............................. 524/343, 602; 428/479.2; 156/330.9

[56] References Cited

U.S. PATENT DOCUMENTS

| | | | |
|---|---|---|---|
| 3,207,620 | 9/1965 | Roth | 524/343 |
| 3,449,273 | 6/1969 | Kettenring et al. | 524/343 |
| 3,454,412 | 7/1969 | Stokes | 524/425 |

FOREIGN PATENT DOCUMENTS 59-130376  7/1984  Japan ................................ 428/475.2

OTHER PUBLICATIONS

Chemical Abstracts, vol. 68, No. 8, Feb. 19, 1968 Abstract 68:30684x.
Chemical Abstracts, vol. 73, No. 8, Aug. 24, 1970 Abstract 73:36447x.
Chemical Abstracts, vol. 79, No. 11, Sep. 17, 1973 Abstract 79:63376d.
Chemical Abstracts, vol. 83, No. 8, Aug. 25, 1975 Abstract 83:60572m.

*Primary Examiner*—Ronald W. Griffin
*Attorney, Agent, or Firm*—Ernest G. Szoke; Patrick J. Span

[57]  ABSTRACT

An improved adhesive composition comprised of a thermoplastic adhesive resin particularly a polymeric fat acid polyamide having small amounts of a bisphenol added as an adhesion promoter. The combination provides improved adhesion to various plastic substrates and a lower viscosity which facilitates application of the resin to substrates.

14 Claims, No Drawings

ADHESIVE COMPOSITION

BACKGROUND OF THE INVENTION

1. Field of the Invention

This invention relates to an improved adhesive composition. The composition is comprised of a thermoplastic adhesive resin particularly a polymeric fat acid polyamide having small amounts of a bisphenol added as an adhesion promoter. The combination provides improved adhesion to various plastic substrates and a lower viscosity which facilitates application of the resin to substrates.

2. Description of the Related Art

Hydroxyl substituted aromatic compounds including bisphenols have been used in the past with various thermoplastic polymers for a variety of purposes. There they have been employed as light, heat and air stabilizers and as a plasticizer.

In U.S. Pat. No. 3,454,412 among heat, light and air stabilizers for polymeric fat acid polyamides are included alkylated bisphenols such as 4,4'-thiobis(6-tert-butyl-o-cresol) 2,2'-thiobis(4-methyl-6-tert-ketyl)-phenol, and 2,6-bis(2πhydroxy-3'-tert-butyl-5'-methyl benzyl)-4-methyl phenol. The compounds are employed in amounts of from 0.5% up to 2%.

In CA 68:30684 reference is made to a French Pat. No. 1475376 in which α-naphtol is employed with a polyamide of fatty acid dimers as an adhesive for plasticized polyvinyl chloride.

In CA 73:36447 reference is made to Japan No. 70 05 400 in which Bisphenol A is included along with octyl p-hydroxybenzoate in a nylon 6 and nylon 6,6 adhesive for cloth. In CA 79:63376 reference is made to Japan Kokai No. 73 36249 which utilizes Bisphenol A to stabilize polyamide solution.

At CA 83:60572 reference is made to Japan Kokai No. 73 47551 in which bisphenols are employed as polyamide plasticizers.

BRIEF SUMMARY OF THE INVENTION

As earlier indicated, improved adhesion to polyester is achieved in the present invention by the addition of a bisphenol to a thermoplastic polymer adhesive resin, particularly a polymeric fat acid polyamide adhesive. The bisphenol is an adhesion promoter and in addition provides lower viscosity to facilitate application to the substrate. The bisphenol is employed in an amount of from 1–25 and preferably above 2 and up to about 10, and most preferably up to about 5 percent by weight of the polyamide and bisphenol.

DETAILED DESCRIPTION OF THE INVENTION

In its broadest aspect the present invention is an adhesive composition comprised of a thermoplastic polymer adhesive and an adhesion promoter wherein the adhesion polymer is a bisphenol. The invention is particulary useful where the thermoplastic adhesive polymer is a polymeric fat acid polyamide resin.

The polymeric fat acid polyamides useful as adhesives are well known and commercial products available from various sources. The polyamides are prepared by the reaction of a polymeric fat acid and a diamine. The polymers are prepared by reaction under the usual condensation reaction conditions for forming polyamides. In general these conditions are reaction at temperatures at about 100°–300° C. for a sufficient time to affect amidification, usually 2–8 hours.

The polymeric fatty or fat acids also sometimes referred to in the art as "dimer acids" are products resulting from the polymerization of fatty acids. The polymeric fat acids are well known and a summary of such acids is found in U.S. Pat. No. 3,157,681. Commercially available polymeric fat acids generally are prepared from polymerization of tall oil fatty acids which will generally have a composition as follows:

|  | Percent by wt. |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

Polymeric fat acids having a higher dimeric fat acid content in excess of 65% by weight and preferably in excess of 90 or 95% by weight are obtained by fractionation by suitable means such as high vacuum distillation with very high purity products having a dimeric fat acid content in the order of 98–99%: There will be less than 1% monomer and/or trimer.

A more detailed description and summary of the preparation of polymeric fat acids can be found in U.S. Pat. No. 3,377,303 and the description therein is incorporated herein by reference. A detailed discussion of the nature and structure of these acids can further be found in Canadian Pat. No. 1,033,996.

The polyamide resins may also include other copolymerizing acid and amine components and the diamine employed may be a single diamine or mixture of different diamines. In addition amounts of monomeric, monocarboxylic acids may be present, either short or long chain, i.e. 2–20 carbon atoms. These will include acids such as acetic, propionic and fatty monomeric acid such as tall oil acids, oleic, stearic, linoleic and residual monomeric fat acids from polymerizing fatty acids. These may be employed in an amount to adjust the viscosity of polyamide polymer to the desired viscosity polymers.

The diamines employed may be aliphatic, cycloaliphatic or aromatic diprimary diamines, which may be ideally represented by the formula

where $R_1$ is an aliphatic, cycloaliphatic or aromatic hydrocarbon radical preferably having from 2 to about 40 carbon atoms. Representative of such diamines are ethylene diamine, 1,2-diaminopropane, 1,3-diaminopropane, 1,3-diaminobutane, tetramethylene diamine, pentamethylene diamine, hexamethylene diamine, decamethylene diamine, octadecamethylene diamine, metaxylylene diamine paraxylylene diamine, cyclohexylene diamine, bis(aminoethyl) benzene, cyclohexyl bis(methyl amine), diamino-dicyclohexyl methane, methylene dianiline, ether diamines such as Jeffamine 230, 400 or 2000, and dimeric fat diamine. The commercially available ether diamines may be defined by the idealized formula

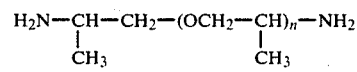

where n is a mean number of 1 to about 9. Cyclic diamines, such as piperazine or aminoethylpiperazine, may also be employed, particularly in combination with the alkylene diamines. The preferred diamines are the alkylene (2-6 carbon atoms) diamines. The diamine may be employed alone or mixtures of two or more may be employed. The most preferred diamines are the alkylene diamines in which the alkylene group has from 2-6 carbon atoms and mixtures thereof with dimeric fat diamine (preferably having 36 carbon atoms), ether diamines or piperazines.

A wide variety of dicarboxylic acids may also be employed along with the polymeric fat acids in the preparation of a composition of this invention. The dicarboxylic compounds employed in the present invention are the aliphatic or cycloaliphatic hydrocarbon compounds, preferably those of the formula:

> ROOC—COOR or ROOCR$_2$COOR where R is selected from the group consisting of hydrogen or alkyl groups containing from 1-8 carbon atoms and R$_2$ is a divalent aliphatic hydrocarbon, or cycloaliphatic, radical having from 1 to 20 and preferably 4 to 12 carbon atoms. The preferred esters are the alkyl esters having from 1-4 carbon atoms, the most preferred being the methyl, ethyl or acetate esters. Illustrative of the dicarboxylic compounds are oxalic, malonic, glutaric, adipic, succinic, suberic, azelaic, sebacic, dodecanedioic and pimelic acids. Such dicarboxylic acids are well known, readily available commercially.

Other difunctional coreactants are the monoalkanol amines which may ideally be represented by the formula

H$_2$N R$_3$OH where R$_3$ is a divalent aliphatic hydrocarbon radical, desirably having from 2 to 8 carbon atoms and preferably an alkylene radical having from 2 to 8 carbon atoms such as monoethanolamine, propanolamine, butanolamine, 2-amino-3-hexanol, 2-amino-4-pentanol, 5-amino-4-octanol, 3-amino-3-methyl-3-butanol. Where an alkanol amine is employed, a polyesterpolyamide product is provided. The use of diols are another means of introducing ester groups or linkages in the polymer. Where employed, the well known commercially available diols are employed. Representative of the preferred diols are the straight chain aliphatic, or cycloaliphatic diols having from 2-20 and preferably 2-6 carbon atoms such as ethylene glycol, 1,3-propylene glycol, 1,4-butylene glycol, and 1,6 hexamethylene glycol.

Essentially molar equivalent amounts of carboxyl and amine groups are employed in preparing the polyamide. Where an alkanol amine or some diol is employed, the carboxyl groups employed are essentially equivalent to the amine plus hydroxy groups. Where copolymerizing dicarboxylic acids or amino acids are employed, it is preferred that the carboxyl groups from the polymeric fat acid should account for at least about 30, preferably at least 50 equivalent percent of the total carboxyl groups present.

As indicated, the polyamide adhesive polymer is employed with an adhesion promoter such as a bisphenol. The bisphenol is added to the polyamide in a sufficient amount to increase the adhesion of the polyamide. The bisphenol is generally added in an amount from 1-25, and preferably above 2 and up to about 10, most preferably up to about 5% based on the total weight of polyamide and bisphenol.

The bisphenol may be represented by the following idealized formula:

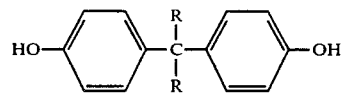

where R is H or CH$_3$. Bisphenol A and Bisphenol F are commercially available products.

The following examples will serve to best illustrate the spirit and scope of the present invention. These examples are not to be construed as limiting, but illustrations of the invention. Percentages and parts are by weight unless otherwise indicated. Also for convenience and illustration, the polymeric fat or fatty acid employed in the examples are polymerized tall oil fatty acids except where otherwise noted.

EXAMPLE I

In this example a polymeric fat acid polyamide and polyesteramide was employed and the Mylar to Mylar adhesion evaluated with and without Bisphenol A (BPA). In the Table I which follows the properties indicated were determined by the following tests:

| | |
|---|---|
| Softening Point - °C. (Ball & Ring): | ASTM E 28 |
| Viscosity - poise | Brookfield Thermosel at 210° C. |
| T-Peel Strength - Pounds per Linear Inch (P/LI) | ASTM D-1876 |

The resins employed were as follows:

| | Equivalent Percent |
|---|---|
| Resin A - Polyamide of: | |
| Polymerized Tall Oil Fatty Acids (Analysis by weight 2.5% Monomer (M); 2.8% Intermediate (I); 92.9 Dimer (D); 1.8% Trimer (T)) | 34 |
| Azelaic acid | 17 |
| Piperazine | 22.5 |
| Ethylene Diamine | 24 |
| Ether Diamine (Jeffamine D-2000) | 2.5 |
| | 100% |
| Resin B - Polyesteramide of: | |
| Polymerized Tall Oil Fatty Acids (Analysis: 0.7% M; 2.7% I; 95.3% D; 1.3% T) | 26.53 |
| Adipic Acid | 17.71 |
| Ethylene Glycol | 33.73 |
| Hexamethylene Diamine | 22.03 |
| Resin C - Polyamide of: | |
| Polymerized Tall Oil Fatty Acids (Same as Resin H) | 100 |
| Ethylene Diamine | 75 |
| Dimer Diamine | 25 |

TABLE 1

| | Ratio Resin/BPA | SOFT PT. °C. | VISC. POISE AT 210° C. | T-PEEL P/LI* AFTER 24 HRS MAX. | T-PEEL P/LI* AFTER 24 HRS AVE. | T-PEEL P/LI* AFTER 1 WK MAX. | T-PEEL P/LI* AFTER 1 WK AVE. |
|---|---|---|---|---|---|---|---|
| Resin A | — | 146 | 17.2 | 7.15 | 3.09 | 4.39 | 2.14 |
| Resin A/BPA | 99:1 | 146 | 13.2 | 11.91 | 9.41 | 10.62 | 6.50 |

TABLE 1-continued

|  | Ratio Resin/BPA | SOFT PT. °C. | VISC. POISE AT 210° C. | T-PEEL P/LI* AFTER 24 HRS MAX. | AVE. | T-PEEL P/LI* AFTER 1 WK MAX. | AVE. |
|---|---|---|---|---|---|---|---|
| Resin A/BPA | 98:2 | 147 | 12.8 | 10.78 | 9.97 | 11.02 | 9.73 |
| Resin A/BPA | 96:4 | 144 | 14.7 | 10.48 | 8.74 | 10.43 | 8.58 |
| Resin B | — | 168 | 14.6 | 3.59 | 2.03 | 3.35 | 2.08 |
| Resin B/BPA | 96:4 | 154 | 7.6 | 7.25 | 6.16 | 7.37 | 6.01 |
| Resin C | — | — | — | 1.47 | 0.35 | — | — |
| Resin C/BPA | 96:4 | — | — | 1.99 | 0.68 | — | — |

*Mylar to Mylar on Sentinel Sealer. Bonding conditions: 1 sec. at 450° F. under 8-10 psig.

EXAMPLE II

In this example the Fiber Tear was tested using a Fiber Tear Test procedure provided by Proctor and Gamble. Briefly, this test method involves bonding the uncoated surface of a test strip to the polyester coated surface of another test strip using a bead of molten resin and finger pressure. The bonded specimens are then tested for fiber tear by hand peel after being conditioned at various temperatures. For commercial purposes in bonding carton board stock, it is desired that the specimen show 100% fiber tear at 20, 40 and 140° F.

In this example the resins were tested with and without Bisphenol A (BPA) in the amount as indicated below. The applications temperature and results are as indicated in Table II.

The resins employed were as follows:

|  | Equivalent Percent |
|---|---|
| Resin D - Polyamide of: |  |
| Polymerized Tall Oil Fatty Acids (Typical Analysis: 8-12% M; 3-9% I; 67-75% D; 9-16% T) | 50 |
| Ethylene Diamine | 40 |
| Piperazine | 7.5 |
| Ether Diamine (Jeffamine D-400) | 2.5 |
| Ball & Ring Softening Point - 98° C. |  |
| Viscosity - 29 poise at 160° C. |  |
| Resin E - Polyamide of: |  |
| Polymerized Tall Oil Fatty Acids (Same as D above) | 50 |
| Ethylene Diamine | 35 |
| Piperazine | 12.5 |
| Ether Diamine (Jeffamine D-400) | 2.5 |
| Ball & Ring Softening Point - 91° C. |  |
| Viscosity - 24.5 poise at 160° C. |  |

TABLE II

|  | Ratio Resin/BPA | Application Temperature °F. (°C.) | % FIBER TEAR AT | | | | |
|---|---|---|---|---|---|---|---|
|  |  |  | 140° F. | 120° F. | 40° F. | 9-11° F. | 0° F. |
| Resin D | — | 340 (171) | 61 | 6 |  | 11 | 0 |
| Resin E | — | 320 (160) | 100 | 61 |  | 14 | 33 |
| Resin D/BPA | 98.2 | 320 (160) | 100 | 67 | 42 |  | 58 |
| Resin D/BPA | 96.4 | 320 (160) | 100 | 100 | 75 |  | 73 |
| Resin D/BPA | 94.6 | 302 (150) | 100 | 100 | 46 |  | 17 |
| Resin E/BPA | 98.2 | 302 (150) | 100 | 100 | 83 |  | 69 |
| Resin E/BPA | 96.4 | 302 (150) | 100 | 100 | 50 |  | 58 |

As can be seen from the foregoing examples the addition of the Bisphenol A improved the adhesion and lowered the viscosity when used in an amount of at least 2%, and showed good fiber tear.

What is claimed is:

1. An adhesive composition comprising a thermoplastic adhesive polymeric fat acid polymer and an adhesion promoting effective amount of a bisphenol compound having the formula

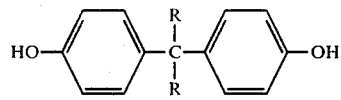

where R is H or CH$_3$.

2. An adhesive composition as defined in claim 1 wherein said bisphenol compound is employed in an amount of from 1-25 percent by weight based on total weight of thermoplastic polymer and bisphenol compound.

3. An adhesive composition as defined in claim 2 wherein said amount is from 2-10 percent.

4. An adhesive composition as defined in claim 1 wherein said bisphenol compound is Bisphenol A.

5. An adhesive composition as defined in claim 1 wherein said thermoplastic adhesive polymer is a polymeric fat acid polyamide.

6. An adhesive composition as defined in claim 5 wherein said polyamide is the amidification product of a polymeric fat acid and a diamine.

7. An adhesive composition as defined in claim 6 wherein said polymeric fat acid is polymerized tall oil fatty acids having a dimeric fat content greater than 65% by weight.

8. An adhesive composition as defined in claim 7 wherein said polymerized tall oil fatty acids have a dimeric fat content of greater that 90%.

9. An adhesive composition comprising a thermoplastic polymeric fat acid polyamide and a bisphenol compound in an amount of 2-10% by weight based on total weight of polyamide and bisphenol compound, said bisphenol compound having the formula

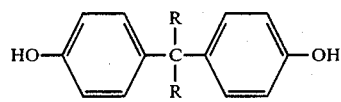

where R is H or CH$_3$.

10. An adhesive composition as defined in claim 9 wherein said polyamide is the amidification product of hexamethylene diamine and polymerized tall oil fatty acids and said bisphenol compound is Bisphenol A.

11. An adhesive composition as defined in claim 9 wherein said polyamide is the amidification product of polymerized tall oil fatty acids, ethylene diamine, piperazine and an ether diamine having a molecular weight of about 400 and said bisphenol compound is Bisphenol A.

12. An adhesive composition as defined in claim 9 wherein said polyamide is the amidification product of polymerized tall oil fatty acids, azelaic acid, piperazine, ethylene diamine and an ether diamine having a molecular weight of about 2000 and said bisphenol compound is Bisphenol A.

13. An adhesive composition as defined in claim 9 wherein said polyamide is the polyesteramide product of polymerized tall oil fatty acids, adipic acids, hexamethylene diamine and ethylene glycol and said bisphenol compound is Bisphenol A.

14. A process of bonding polyester polymer substrates with a thermoplastic adhesive polymer composition the improvement wherein said polymer is a polymeric fat acid polyamide containing an adhesion promoting amount of a bisphenol compound.

* * * * *